3,232,834
ANTIBIOTIC PREPARATIONS
Philip N. Gordon, Old Lyme, Conn., and Charles I. Jarowski, Massapequa Park, and Karl J. Brunings, Malba N.Y., assignors to Chas. Pfizer & Co., Inc., New York, N.Y., a corporation of Delaware
No Drawing. Filed June 27, 1957, Ser. No. 668,313
8 Claims. (Cl. 167—65)

This invention is concerned with antibiotic preparations of particular value for intramuscular administration. Specifically the invention is concerned with preparations containing an acid salt of a tetracycline antibiotic and the metallic salt magnesium chloride.

This application is a continuation-in-part of copending application No. 441,941 of Charles I. Jarowski et al., filed July 7, 1954, which in turn is a continuation-in-part of earlier application Serial No. 311,301 filed on September 24, 1952, said earlier-filed applications both having been abandoned. These applications are concerned with certain therapeutically useful compositions of the antibiotics oxytetracycline, chlortetacycline, and tetracycline.

It has been found that certain of these compositions containing the hydrochloric, hydrobromic, hydroiodic, sulfuric, and nitric acid addition salts of these antibiotics are superior to the other forms of the antibiotics for intramuscular injection. These unique compositions are now specifically claimed.

Although a tetracycline antibiotic such as the base, the hydrochloride or various metal salts, may be injected intramuscularly with the achievement of antibiotic blood levels in the system of the animal, it has been found that appreciable irritation often accompanies injections of these materials. This is particularly true if repeated injections are made at the same point or at places close to the original injection. Furthermore, there is a tendency for residual material to remain in the muscle at the site of injection for considerable periods. This is definitely an undesirable effect since fibrous tissue develops accompanied by pain and tenderness.

Certain metal salt-tetracycline antibiotic metal complexes including the aluminum chloride, aluminum bromide, magnesium chloride, stannous chloride, ferric chloride, etc. complexes have been suggested for parenteral use since less irritation results on injections of these materials. While some improvement is observed from the standpoint of irritation over the free antibiotic alone either as the base or the hydrochloride, these metal salt complexes are unsatisfactory dosage forms since these materials are poorly absorbed and residual material remains at the site of injection. This situation, which also obtains with metal salt-complexes such as the calcium chloride complex, is still encountered on injection of the antibiotics in their amphoteric form when mixed with various metal salts such as ferric chloride, calcium chloride, or magnesium chloride. With the latter some reduction in irritation is observed but the degree of absorption remains unsatisfactory.

It has now been found that the injection by the intramuscular route of a mixture of a pharmaceutically acceptable acid addition salt of a tetracycline antibiotic and magnesium chloride appreciably reduces the degree of irritation and other undesired side effects that are encountered. Furthermore, there is remarkable reduction in the retention of residual material in the muscle after repeated injections, that is, the absorbency of the antibiotic preparation is more complete when the tetracycline antibiotic salt is used with magnesium chloride. By pharmaceutically acceptable acid addition salt of a tetracycline antibiotic is meant an acid addition salt of tetracycline, oxytetracycline, or chlortetracycline whose anion is without toxic effect or deleterious side reaction in the tetracycline antibiotic dosage required, and which provides a clear solution on constitution with water of a mixture thereof with magnesium chloride.

Water is the most suitable vehicle for the injection of the compositions of this invention since maximum absorbency is achieved from this solvent, other injectable vehicles may be used for this purpose. For instance, propylene glycol is quite effective as dissolving medium for the composition. Various injectable oils may also be used for this purpose. These include oils such as sesame oil, peanut oil, and so forth. The components, are, of course, insoluble in the oil and the injection of a suspension is required. In such event fine division of the tetracycline antibiotic is particularly necessary. Unless the particles of the suspension are quite fine, they will not pass through the lumen of a hypodermic needle with ease. It should be noted that, when a composition of magnesium chloride and a water-soluble tetracycline antibiotic acid addition salt is dissolved in water, the preparation should be used for injection within a reasonably short period after the preparation of the solution, preferably within about an hour, since there is a tendency for the separation of some solid material upon prolonged standing. Furthermore, there is some tendency to darkening and slight decomposition of the solution.

Compositions of an acid addition salt of a tetracycline antibiotic and magnesium chloride may be improved by the inclusion of a water soluble organic acid of suitably low toxicity. The improvement is especially noticeable with tetracycline compositions. These materials serve to lower the pH of the composition when mixed with water and assist in the formation of a clear aqueous solution which is a particularly useful form for injection by the intramuscular route. This adjunct is not necessary with the oxytetracycline compositions since clear solutions result without added organic acid. Although the compositions may be administered by other routes, such as the intravenous route, they are of particular value for intramuscular administration. Among the organic acids which may be used in the compositions including a tetracycline antibiotic and magnesium chloride, are the following: citric acid, gluconic acid, lactic acid, ascorbic acid, maleic acid, malic acid, malonic acid, nicotinic acid, glycine, glutamic acid, and other similar lower carboxylic organic acids containing up to about seven carbon atoms. Hydroxylated organic acids of appreciable water solubility are quite effective. Compounds which, in addition to water, form such organic acids are also acceptable. These include derivatives such as the lactones of certain of these acids such as glucurono-lactone.

A further component which may be utilized in the present composition with appreciable improvement in the properties of these materials is a water-soluble local anesthetic. The most useful of these compounds is procaine hydrochloride. Other dialkylamino alkanol esters of p-aminobenzoic acid as the water soluble salts, e.g. hydrochloride, are also very useful for this purpose. Such compounds seem to assist appreciably in increasing the solubility of certain of the antibiotic compounds in the aqueous preparations. This is particularly true of tetracycline hydrochloride which does not have a high degree of solubility in water. A further unpredictable and beneficial feature is that absorption of the antibiotic is not delayed by the presence of these substances.

It has been found that the proportion of acid salt of the tetracycline antibiotic to magnesium chloride may be varied considerably. A ratio of about two moles of magnesium chloride to one of the antibiotic is preferred and even higher proportions of magnesium chloride and the antibiotic when utilized have shown improvement over corresponding compositions including the antibiotics in their amphoteric form and over the metal complexes to which reference was made above. A truly remarkable improvement in all respects is observed, however, with at least about two molar proportions of magnesium chloride and it is recommended that this proportion be employed.

Preliminary evaluation of the present compositions involved intramuscular injections of rats, rabbits, and dogs as test animals with the compositions. In no case in which at least about two molar proportions of magnesium chloride were employed was any residue found at autopsy 24 hours after the last injection even after repeated daily injection of dogs at the same location. Similar results were observed in other animals. In man, the present compositions have proven to be truly elegan products virtually devoid of residual pain or irritation. In one specific test in dogs employing one molar proportion of magnesium chloride with oxytetracycline hydrochloride, from moderate to substantial amounts of residue remained 24 hours after the last injection, and in another employing a 1:1 magnesium chloride-chlortetracycline complex prepared in methanol from the antibiotic base, absorption took place to the extent of only about 15-25% on instramuscular injection.

Blood levels of the order of at least 6 mcg./ml. of antibiotic are obtained on intramuscular injection of the present compositions as compared to values of less than 1 mcg./ml. for compositions including such metal salt complexes as clacium chloride-oxytetracycline, cobalt chloride - tetracycline, aluminum chloride - chlortetracycline, ferric chloride-oxytetracycline etc.

The proportion of the local anesthetic when employed should be sufficient so that when the preparation is diluted with water a solution of sufficient strength to impart appreciable anesthetic properties to the composition is attained. In general, a concentration of at least about 1% by weight in the diluted composition is desirable. Higher concentrations up to about 5% may also be used. There is no distinct advantage in utilizing proportions of the local anesthetic that would yield concentrations higher than 5%, however, there is no serious objection to a concentration somewhat higher. If a water-soluble organic acid is to be included in the composition, this material may be used to the extent of at least about 0.5 parts by weight to 1 part by weight of the broad spectrum antibiotic.

It should be realized that the proportion of the various components used in the preparation of the compositions of this invention may be varied appreciably. If the weight of one of these materials is altered it may be necessary to alter the weights of other materials in order to obtain the best possible preparation. It should also be noted that, although the products of the present invention are particularly useful for intramuscular injection, many of the solutions which are formed by the addition of water or other suitable injectable media to the compositions, are useful not only for intramuscular injections but also may be used by the intravenous route.

The compositions of this invention may be prepared merely by mixing the desired tetracycline antibiotic acid salt with the chosen proportion of magnesium chloride. It is usually preferable to have both materials in rather finely divided form and agitate the mixture to obtain a uniform product. Standard pharmaceutical equipment may be used for this purpose. The mixture may be milled or otherwise agitated. However, prolonged high temperature should be avoided.

The following examples are given by way of illustration and are not intended as limitations of this invention. Indeed, as many apparently widely different embodiments of the present invention may be made without departing from the spirit and scope hereof.

*Example I*

A composition was prepared containing the following materials.

|  | G. |
|---|---|
| Oxytetracycline hydrochloride (895 mcg./ml. parenteral grade) | 131.3 |
| Magnesium chloride hydrate (40-45% water) | 92.0 |
| Procaine hydrochloride (parenteral grade) | 46.0 |

The magnesium chloride was prepared by sterilizing analytical reagent grade magnesium chloride hexahydrate with ethylene oxide and then drying it under aseptic conditions in high vacuum driers at 50° C. for 72 hours until the water content was reduced to the above. All components were then thoroughly mixed and blended in a sterile fiber free blender such as a twin shell blender. The batch was then milled through a 40-mesh screen, and then reblended in a sterile fiber free twin shell blender. Because of the great affinity of the magnesium chloride for water, care must be exercised throughout all operations involving the handling of this material to prevent excessive absortpion of moisture from the atmosphere. The blend was then subdivided into 1000 bottles each containing 269.1 mg. of the blend affording at least 100 mg. per bottle of oxytetracycline activity plus a slight excess.

The contents of a single bottle is administered to a patient by dissolving in 2.3 ml. of sterile distilled water and injecting intramuscularly. The dry mixture is stable for periods of time in excess of two years. In accelerated stability tests at 50° C., 96.2% of the oxytetracycline activity was retained after six weeks. After reconstitution with water as above, 100% of the oxytetracycline activity is retained for periods of six days or more both at room temperature and at refrigerator temperature. It is, however, recommended that the solution be administered promptly after reconstitution.

A group of twelve dogs was used to test the above formulation. Each dog was given a daily 1 cc. intramuscular injection of the reconstituted material into the gluteus maximus, and each injection was given as closely as possible in the same location. All animals were examined daily for symptoms and signs of local irritation such as swelling, tenderness, lameness, etc. Twenty-four hours after the last injection all animals were sacrificed and the muscles were carefully dissected and examined for signs of local tissue irritation such as hemorrhage, necrosis, etc. It was found that the injections were well tolerated with no significant indication of irritation or residue remaining at the site of injection.

The blood levels of oxytetracycline in rabbits were determined following single intramuscular injections of the above formula at a dosage level of 100 mg./kg. of oxytetracycline activity. These results are arranged in the following table.

SERUM LEVEL OF OXYTETRACYCLINE

| Time after injection: | Average (four animals), mcg./ml. |
|---|---|
| 1 | 17.5 |
| 3 | 17.5 |
| 5 | 10 |
| 7 | 7.5 |
| 24 | 2.9 |

It is apparent that significant blood levels are present for at least 24 hours following injection.

*Example II*

Compositions are prepared employing two molar proportions of magnesium chloride and one molar proportion each of oxytetracycline hydrobromide, oxytetracycline hydroiodide, oxytetracycline nitrate $(C_{22}H_{24}N_2O_9 \cdot HNO_3)$ and oxytetracycline sulfate $(C_{22}H_{24}N_2O_9 \cdot H_2SO_4)$. Each of these salts in this fashion provides a composition which is well tolerated on intramuscular injection when constituted with water at a concentration of 50 mg./ml. of oxytetracycline activity with virtually complete absorption of injected material within 24 hours, and very little irritation of the tissue at the site of injection.

Example III

A tetracycline intramuscular formulation of the present invention was prepared from the following ingredients.

|  | G. |
|---|---|
| Tetracycline hydrochloride (parenteral grade assaying 980 mcg./ml.) | 104.1 |
| Magnesium chloride hydrate (approximately 40% water, Example I) | 77.2 |
| Procaine hydrochloride (60 mesh, parenteral grade) | 39.2 |
| Ascorbic acid, USP | 250.0 |

The blending and milling operation was carried out as described in Example I. The blend was then filled into bottles of appropriate size, the fill weight being 518 mg. per bottle affording, on an activity basis, 100 mg. of tetracycline per bottle plus a slight excess. For dosage at 25, 50 and 100 mg./ml. respectively, the contents of each bottle was dissolved in 4.3, 2.0, or 0.84 ml. of sterile distilled water respectively. This composition at concentrations of 25 and 50 mg./ml. of tetracycline was well-tolerated on intramuscular injection into the hind limbs of rabbits. The use of more concentrated solutions gave rise to mild to moderate inflammatory reactions although the absorption was good in all cases. An accelerated stability study at 50° C. for four weeks indicated that the dry mixture retained 94.3% of its original assay activity.

Example IV

A mixture of one molecular proportion of crystalline chlortetracycline hydrochloride and two molecular proportions of magnesium chloride hexahydrate was prepared. The material was finely ground and intimately mixed. Sufficient of this material is furnished 600,000 micrograms of chlortetracycline was dissolved in six milliliters of propylene glycol. The deeply colored solution had a pH of 0.5. One milliliter of this preparation was injected in the muscle of the hind limb of each of six rabbits. At the end of twenty-four hours, two of the rabbits were sacrificed and the site of injection was examined for the degree of irritation and for the absorption of the antibiotic preparation. This was repeated at forty-eight hours and at seventy-two hours after the injection. Examination of the muscles of the rabbit showed that the degree of absorption was good and that the degree of irritation caused by the preparation was definitely lower than that caused by chlortetracycline hydrochloride alone.

A suspension containing 100 mg./ml. of chlortetracycline magnesium chloride complex was injected into rabbits in a similar fashion. Dissection 24 hours after injection revealed that a considerable amount of unabsorbed residue remained in the muscle, and that the muscle in the surrounding area showed evidence of induration and slight to severe hemorrhage.

The chlortetracycline magnesium chloride complex employed had been prepared by slurrying 0.01 mole of amphoteric chlortetracycline with 0.01 mole magnesium chloride hexahydrate in 25 ml. of methanol and precipitating the product with 125 ml. of ether. It was concluded that the complex was unsatisfactory for intramuscular injection due to the irritation produced and the fact that it was poorly absorbed.

Example V

A mixture containing 10 grams each of anhydrous tetracycline hydrochloride and magnesium chloride hexahydrate and 5 grams of procaine hydrochloride, was prepared and thoroughly blended. The mixture was subdivided into portions sufficient to furnish 500 milligrams of tetracycline hydrochloride and these were placed in rubber capped bottles. Upon addition of pyrogen free distilled water to the bottles, a preparation suitable for therapeutic use was obtained. In general, sufficient water was added to yield a composition of about 100 milligrams of tetracycline hydrochloride per milliliter.

Example VI

A mixture of the following materials was prepared:

|  | Mgs. |
|---|---|
| Magnesium chloride hexahydrate | 100 |
| Tetracycline hydrochloride | 120 |
| Procaine hydrochloride | 46 |
| Citric acid | 100 |

This material when dissolved in 2.7 milliliters of water gave a product particularly suitable for intramuscular injection.

Example VII

A mixture of the following materials was prepared:

|  | Mgs. |
|---|---|
| Tetracycline hydrochloride | 126 |
| Magnesium chloride dihydrate | 75 |
| Procaine hydrochloride | 46 |

When this mixture was diluted to 2.3 cc. with water a clear yellow solution with pH 2.0 was obtained.

Example VIII

A mixture of the following materials was prepared:

|  | Mgs. |
|---|---|
| Tetracycline hydrochloride | 120 |
| Magnesium chloride dihydrate | 75 |
| Procaine hydrochloride | 46 |
| Ascorbic acid | 300 |

When this mixture was diluted with water so that the solution had a concentration of 77 milligrams of antibiotic activity per milliliter, a clear solution with pH 1.5 was obtained.

Example IX

A mixture of the following materials was prepared:

|  | Mgs. |
|---|---|
| Tetracycline hydrochloride | 295 |
| Nicotinic acid | 100 |
| Magnesium chloride dihydrate | 278 |
| Tetracaine hydrochloride | 60 |

When this mixture was diluted to 2.7 cc. with water, a clear solution with pH 2.0 resulted.

Example X

A mixture of the following materials was prepared:

|  | Mgs. |
|---|---|
| Magnesium chloride hexahydrate | 100 |
| Tetracycline hydrochloride | 120 |
| Glycine hydrochloride | 40 |

This composition when dissolved in 2.7 ml. of water provided a product particularly suitable for intramuscular injection.

Example XI

A mixture of the following materials was prepared:

|  | Mgs. |
|---|---|
| Magnesium chloride hexahydrate | 100 |
| Tetracycline hydrochloride | 120 |
| Glutamic acid hydrochloride | 75 |

This composition when dissolved in 2.7 ml. of water provided a product particularly suitable for intramuscular injection.

The selection of tetracycline antibiotic acid addition salts useful in the compositions of the present invention is carried out in the following fashion. The salt is slurried in a small amount of water and an aqueous solution containing two molecular portions of magnesium chloride is added. The mixture is then diluted to an antibiotic concentration of 50 mg./ml. If a clear or only slightly turbid solution results, the antibiotic salt is operable, provided, of course, the anion creates no toxicity problem.

Various mineral and strong organic acid addition salts of the tetracycline antibiotics may be prepared by dissolving the amphoteric antibiotic in methyl Cellosolve, and adding one equivalent of the acid dissolved in water.

What is claimed is:

1. A therapeutically effective composition useful for the preparation of intramuscularly injectable liquid preparations which comprises a mixture of a tetracycline antibiotic acid addition salt selected from the group consisting of the hydrochlorides, hydrobromides, hydroiodides, nitrates, and sulfates of tetracycline, chlortetracycline, and oxytetracycline and at least about two molar proportions of magnesium chloride.

2. A composition as claimed in claim 1 wherein the tetracycline antibiotic acid addition salt is oxytetracycline hydrochloride.

3. A composition as claimed in claim 1 wherein the tetracycline antibiotic acid addition salt is chlortetracycline hydrochloride.

4. A composition as claimed in claim 1 wherein the tetracycline antibiotic acid addition salt is tetracycline hydrochloride.

5. A composition as claimed in claim 1 wherein the tetracycline antibiotic acid addition salt is oxytetracycline sulfate.

6. A composition as claimed in claim 1 also containing a water-soluble local anesthetic.

7. An intramuscularly injectable preparation which comprises a mixture of a tetracycline antibiotic acid addition salt selected from the group consisting of the hydrochlorides, hydrobromides, hydroiodides, nitrates, and sulfates of tetracycline, chlortetracycline, and oxytetracycline and at least about two molar proportions of magnesium chloride in a liquid injectable vehicle.

8. A product useful for the preparation of intramuscularly injectable liquid preparations which comprises a dry mixture of a tetracycline antibiotic acid addition salt selected from the group consisting of the hydrochlorides, hydrobromides, hydroiodides, nitrates, and sulfates of tetracycline, chlortetracycline, and oxytetracycline and at least about two molar proportions of magnesium chloride.

References Cited by the Examiner

UNITED STATES PATENTS

| | | | |
|---|---|---|---|
| 2,482,055 | 9/1949 | Duggar | 167—65 |
| 2,516,080 | 7/1950 | Sobin | 167—65 |
| 2,640,842 | 6/1953 | Weidenheimer | 260—439 |
| 2,699,054 | 1/1955 | Conover | 260—559 |
| 2,803,657 | 8/1957 | Ritter | 260—559 |
| 2,886,595 | 5/1959 | Heinemann et al. | 260—559 |
| 2,980,584 | 4/1961 | Hammer | 167—65 |
| 2,990,331 | 6/1961 | Neumann et al. | 167—65 |
| 3,017,323 | 1/1962 | Gordon et al. | 167—65 |
| 3,026,248 | 3/1962 | Noseworthy et al. | 167—65 |

FOREIGN PATENTS

| | | |
|---|---|---|
| 507,692 | 6/1952 | Belgium. |
| 503,866 | 6/1954 | Canada. |

OTHER REFERENCES

Albert, "Avidity of Terramycin and Aureomycin for Metallic Cations," Nature, No. 4370, Aug. 1, 1953, p. 201.

Collins, Ann. Int. Med., December 1948, p. 1078.

Eisner et al., "Enhancement of Serum Levels of Aureomycin," J. Pharmacol. and Exp't'l Therapeutics, August 1953, pp. 442–449.

Moore et al., "Blood Level of Magnesium Ion in Relation to Analgesic . . . Effects," Am. J. of Physiology, vol. 135, December 1941–February 1942, pp. 492–495.

Sollman, "Manual of Pharmacology," W. B. Saunders Co., 1932, Fourth Ed., pp. 839–845.

LEWIS GOTTS, *Primary Examiner.*

MORRIS O. WOLK, IRVING MARCUS, *Examiners.*

H. D. SINGMAN, SHEP K. ROSE, *Assistant Examiners.*